United States Patent [19]

McGonigle et al.

[11] Patent Number: 5,351,916
[45] Date of Patent: Oct. 4, 1994

[54] SYSTEM FOR AUTOMATIC LOADING OF VEHICLES FOR TRANSPORT

[75] Inventors: Kevin P. McGonigle, Milford; James A. Monson, Waterbury; Timothy R. Budd, Trumbull, all of Conn.

[73] Assignee: United Technologies Corporation, Hartford, Conn.

[21] Appl. No.: 51,034

[22] Filed: Apr. 20, 1993

[51] Int. Cl.$^5$ ................................................. B64C 1/22
[52] U.S. Cl. .................................... 244/115; 244/137.1
[58] Field of Search ................... 244/115, 116, 118.1, 244/102 SS; 414/559; 280/704, 43.23; 180/209

[56] References Cited

U.S. PATENT DOCUMENTS

| | | | |
|---|---|---|---|
| 4,265,588 | 5/1981 | Oshel et al. | 244/137.1 |
| 4,630,788 | 12/1986 | Veaux et al. | 244/102 SS |
| 4,907,935 | 3/1990 | Mankey | 244/137.1 |
| 5,123,615 | 6/1992 | Wagner et al. | 244/116 |

*Primary Examiner*—Michael S. Huppert
*Assistant Examiner*—Anne E. Bidwell
*Attorney, Agent, or Firm*—Michael Grillo

[57] ABSTRACT

A control system for automatically loading and unloading a vehicle (10) from a cargo compartment comprises a plurality of distance measuring sensors (31,32,33,34) attached to specified locations on the exterior surfaces of the vehicle (54,56,57) and the cargo compartment (55). The sensors provide distance signals, indicative of the distance between each sensor and the nearest obstruction, to a microprocessor which compares each of the distance signals to reference signals indicative of the minimum allowable clearance between each specified location and an obstruction. During activation of an automatic loading/unloading switch (70), a winch (39) is activated to move the vehicle into or out of a cargo compartment if each of the distances is greater than the corresponding minimum allowable clearance. If any clearance is less than the minimum allowable clearance while the vehicle is being moved, movement of the vehicle is automatically stopped and the height of the vehicle is adjusted (800-815) until all of the distances are greater than the corresponding minimum allowable clearances, after which the winch is reactivated to continue moving the vehicle. The cycle is repeated until the helicopter is in its final position or the automatic loading/unloading switch is released.

11 Claims, 5 Drawing Sheets

SYSTEM FOR AUTOMATIC LOADING OF VEHICLES FOR TRANSPORT

TECHNICAL FIELD

The present invention relates to transport of helicopters and more particularly to a system for controlling the positioning of a helicopter during loading into or discharge from a cargo compartment.

BACKGROUND OF THE INVENTION

A wide variety of cargo and equipment, including helicopters, is airlifted via transport aircraft. The speed and ease of loading and discharging cargo and equipment is greatly influenced by its physical dimensions. For example, many helicopters are too tall to be simply rolled up and down the loading ramps of typical transport aircraft. Therefore, adjustments to the height of the helicopter are required to prevent damage to the helicopter and damage to the transport aircraft during helicopter loading and discharge. Many helicopters are provided with hydraulic shock struts which may be used to make the desired adjustments to the height of the helicopter by varying the hydraulic pressure in the shock struts. Other methods of varying the height of the helicopter may also be used such as pneumatic and electro-mechanical devices.

Typically, helicopters are loaded and unloaded by crews who make the required adjustments to the helicopter's overall height. Several crew members are required to monitor the position of the helicopter, and a winching system or pushing system is utilized to move the helicopter into and out of a cargo compartment. The helicopter is moved until observers determine that the minimum helicopter to obstruction clearance has been reached. The movement of the helicopter is then stopped, and its height is adjusted until all clearances are satisfactory. The cycle is repeated until the helicopter is fully loaded or unloaded from the transport aircraft cargo compartment. This loading procedure can be very time consuming, particularly if a large number of height adjustment are required.

Modern military requirements reduce the amount of time available for loading and discharging helicopters. This reduced time is caused by the speed by which the military is required to respond to various threat and emergency situations. Additionally, reductions in personnel numbers and training are being forced by the desire for efficiency and cost effectiveness. It is very challenging to satisfy all of these demands using existing technology for the loading or discharge of helicopters from a transport aircraft.

DISCLOSURE OF INVENTION

Objects of the invention include provision of a system for automatically controlling the positioning of a helicopter during loading into and discharge from a cargo compartment.

A further object of the invention is to provide a system which reduces the number of personnel and time required for loading and discharging a helicopter from a cargo compartment.

A still further object of the present invention is to provide a system for automatically loading and discharging a helicopter from a cargo compartment which minimizes the possibility of damaging both the helicopter and the cargo compartment during loading and discharge.

According to the present invention, a plurality of distance measuring sensors are attached to specified locations on the exterior surfaces of a helicopter, the sensors provide distance signals indicative of the distance between each sensor and the nearest obstruction, the distance signals are provided to signal processing means which compares each of the distance signals to reference signals indicative of the minimum allowable clearance between each specified location and an obstruction, if each of the distances is greater than the corresponding minimum allowable clearance, a winching system is activated to move the helicopter into or out of a cargo compartment, and if any of the distance signals indicate that a clearance is less than the minimum allowable clearance while the helicopter is being moved, movement of the helicopter is automatically stopped and the height of the helicopter is automatically adjusted until all of the distances are greater than the corresponding minimum allowable clearances, after which the winching system is reactivated to continue moving the helicopter, and the cycle is repeated until the helicopter is in its final position.

In further accord with the present invention, during automatic adjustment of helicopter height, the height of the helicopter is adjusted to maximize all of the clearances, thereby centering the helicopter within a clearance envelope, prior to recommencing movement of the helicopter.

In still further accord with the present invention, distance measuring sensors may also be attached to specified locations on or within a cargo compartment in which a helicopter is being loaded or unloaded, and the height of the helicopter is adjusted as described hereinabove to maintain the clearance between the sensor and the helicopter airframe greater than the corresponding minimum allowable clearance.

The present invention provides a significant improvement over the prior art because the positioning of a helicopter is automatically controlled during loading or discharge from a cargo compartment. The helicopter is rapidly loaded or discharged using fewer personnel and minimizing the chances of damaging the helicopter and transport aircraft due to operator error. The system can be used with a variety of types of helicopters. The operator is instructed on where to place distance measuring sensors on the airframe of each type of helicopter the system is used with. The operator may also be instructed to place distance measuring sensors at specified locations within a cargo compartment for certain helicopter and transport aircraft combinations. A look-up table may be used to provide the minimum allowable clearances between each sensor and an obstruction based on the type of helicopter being loaded or unloaded and the specific cargo compartment being used, i.e., the type of transport aircraft used. Alternatively, the minimum clearances for each of the sensor locations can be set equal to a fixed distance based on the minimum clearances which would be encountered at each sensor location for all of the possible helicopter and transport aircraft combinations.

During automatic loading or discharge, movement of the helicopter is automatically stopped if any one of the measured clearances is less then a corresponding minimum allowable clearance. The height of the helicopter is then automatically adjusted to increase the clearance between critical points on the helicopter airframe and the cargo compartment structure. The clearances are adjusted so that the helicopter is centered in a clearance envelope, thereby minimizing the number of times that helicopter height must be adjusted during loading and discharge.

The foregoing and other objects features and advantages of the present invention will become more apparent in light of the following detailed description of exemplary embodiments thereof, as illustrated in the accompanying drawings.

BEST MODE FOR CARRYING OUT THE INVENTION

The automatic loading system of the present invention is particularly well suited for controlling the position of a helicopter during loading or discharge from a transport aircraft cargo compartment. The system provides rapid helicopter loading and discharge with fewer operators, while minimizing the chance of damage to the helicopter and transport aircraft during loading or discharge from the cargo compartment.

Figure 1:
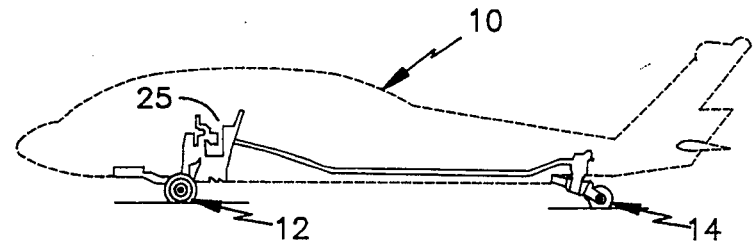
FIG. 1 is a side view of a helicopter showing main and tail landing gear connected to a hydraulic cart assembly, the helicopter being shown in phantom.
Figure 2:
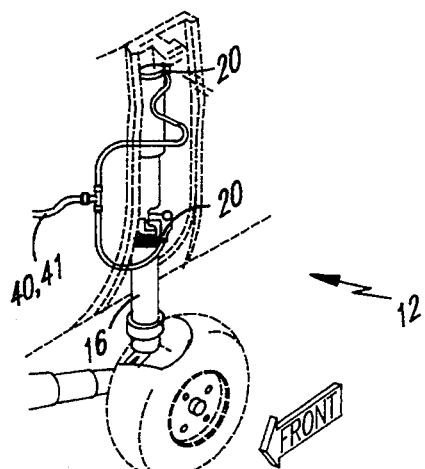
FIG. 2 is a perspective view of a main landing gear shock strut connected to a hydraulic pressurization line, the main landing gear wheel and helicopter airframe being shown in phantom.
Figure 3:
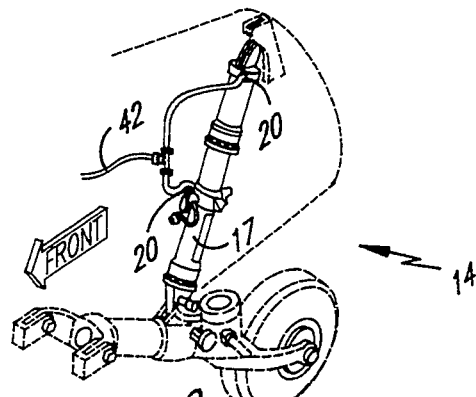
FIG. 3 is a perspective view of a tail landing gear shock strut connected to a hydraulic pressurization line, the tail landing gear wheel and helicopter airframe being shown in phantom.

Referring to FIGS. 1, 2 and 3, the helicopter 10 is provided with a main landing gear 12 and a tail landing gear 14. The main and tail landing gear 12, 14 are typically provided with shock struts 16, 17 which absorb the vertical shock or force applied to the helicopter airframe when the helicopter lands on its landing gear. The present invention will be described with respect to a helicopter having hydraulic shock struts, e.g. shock struts loaded with hydraulic oil. However, there are numerous other shock strut designs used for main and tail landing gear such as mechanical and pneumatic shock struts.

Hydraulic shock struts are typically provided with kneeling valves 20 where hydraulic pressure may be applied or vented. The stiffness characteristic of the shock struts may be varied by varying the hydraulic pressure in the shock struts. Additionally, the extension of the shock struts, and therefore the height of the helicopter, may be adjusted by varying the shock strut hydraulic pressure.

Figure 4:
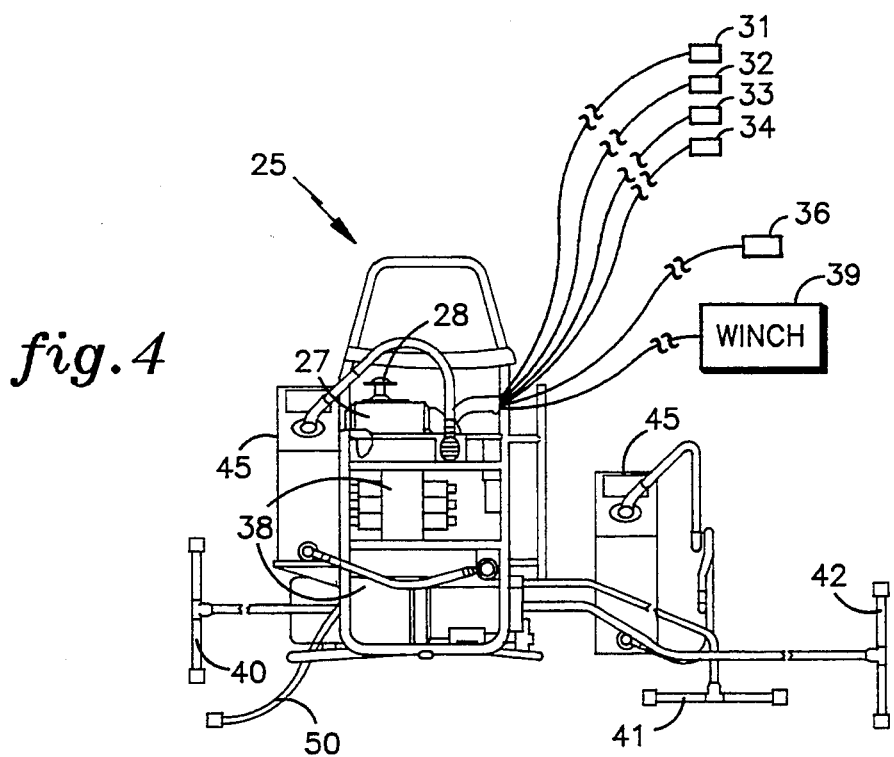
FIG. 4 is a front view of the hydraulic cart assembly of FIG. 1.

Referring also to FIG. 4, a hydraulic cart assembly 25 is used in conjunction with the control system of the present invention to control the hydraulic pressure in the landing gear shock struts, thereby controlling the height of the helicopter during loading or discharge from a cargo compartment. The hydraulic cart assembly 25 comprises a controller 27 having a microprocessor (UPROC) which is responsive to signals from four distance measuring sensors 31, 32, 33 and 34 and a control pendant 36. In response to signals from the distance measuring sensors and the control pendant, the controller 27 controls a hydraulic power plant 38 and a winch 39. The controller 27 is also provided with an emergency stop switch 28 which may be used to shut down the hydraulic power plant 38 and the winch 39 in an emergency situation. The hydraulic power plant 38 provides hydraulic pressure to the right main landing gear in lines 40, the left main landing gear in lines 41, and the tail landing gear in lines 42. Hydraulic reservoirs 45 provide hydraulic fluid to pressurize the landing gear via lines 40, 41 and 42 and also allow for venting of hydraulic fluid via the lines 40,41,42. Power is provided to the hydraulic power plant 38 and the controller 27 via a power cable 50, e.g., 120 VAC, 60 Hz.

During loading of a helicopter in a cargo compartment, the hydraulic cart assembly is typically mounted or placed inside of the helicopter passenger compartment. The hydraulic cables 40, 41 and 42 are then connected to the landing gear shock strut kneeling valves 20, and the kneeling valves are equalized and opened. The distance measuring sensors 31, 32, 33 and 34 are placed at specified locations on the helicopter airframe and in the cargo compartment. The precise placement of the distance measuring sensors will depend on the type of helicopter being loaded and the type of transport aircraft cargo compartment. An instruction manual provides operator instructions regarding the precise placement of the distance measuring sensors. Alternatively, the controller may be provided with a look-up table which comprises information on the precise placement of distance measuring sensors based on each possible helicopter and cargo compartment combination. An electronic display (not shown) would be provided to display these instructions to the operator.

Figure 5:
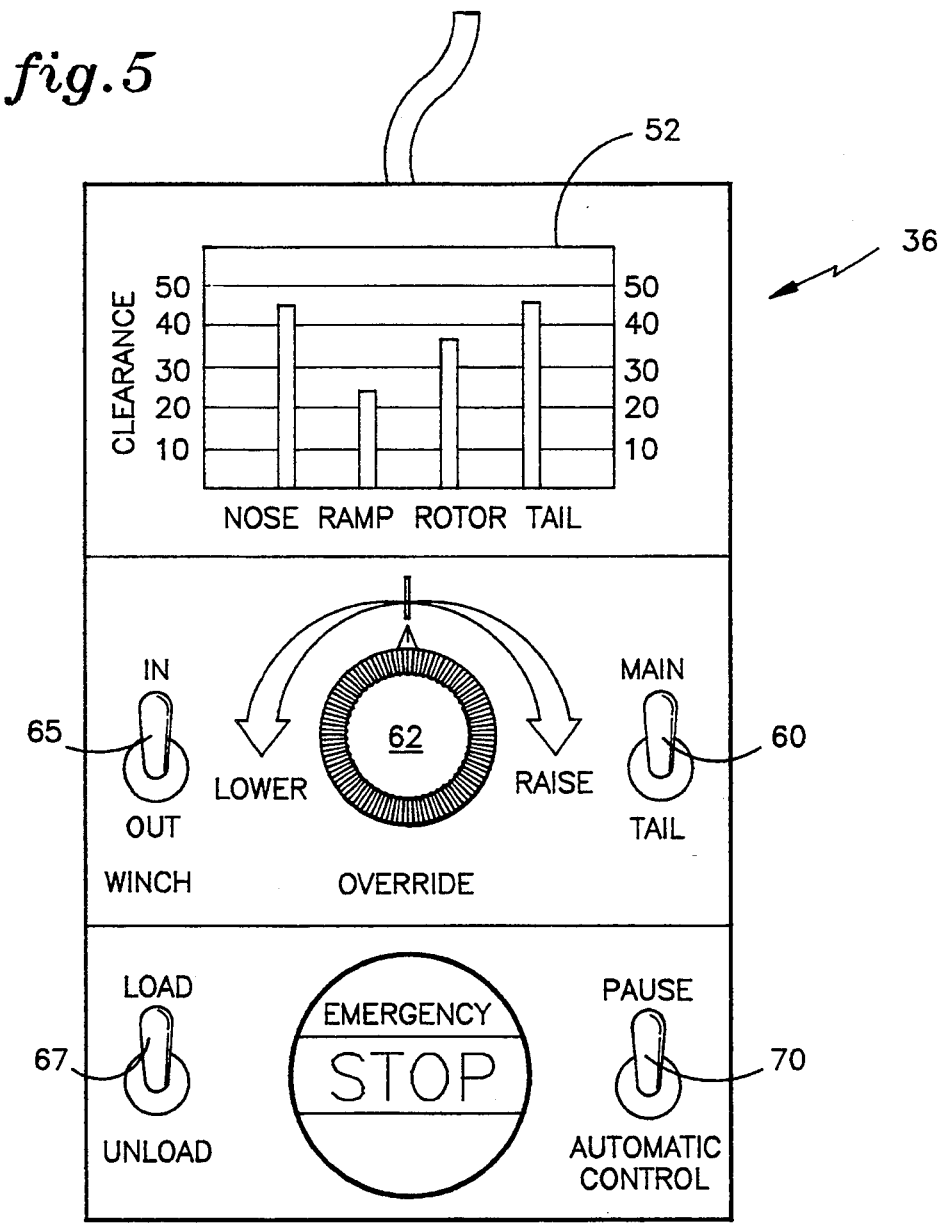
FIG. 5 is a front view of a control pendant of the hydraulic cart assembly of FIG. 4.
Figure 6:
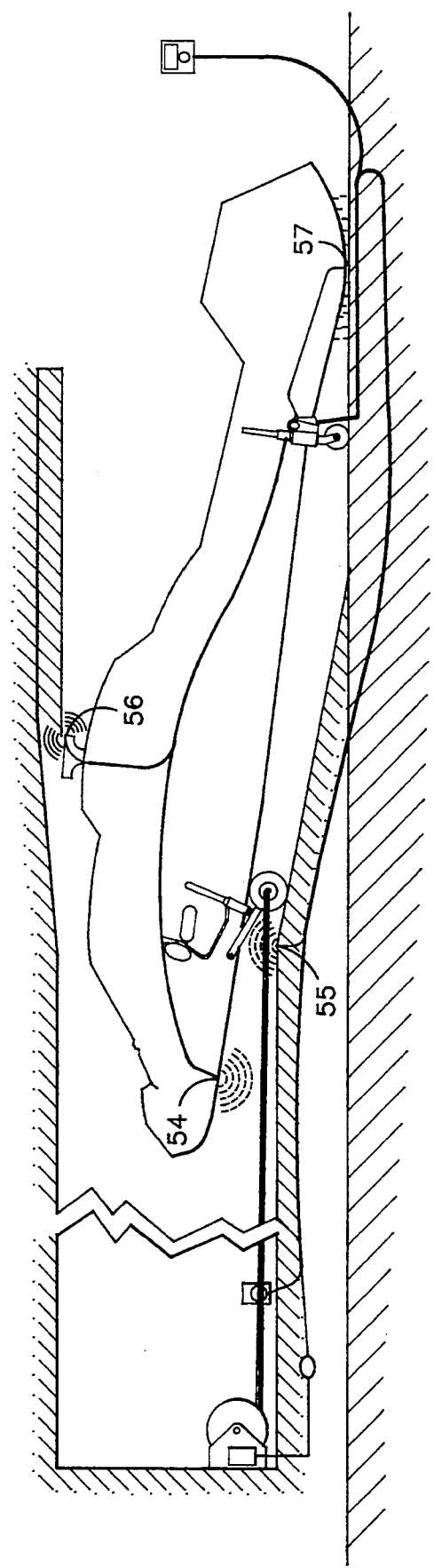
FIG. 6 is a side view of a helicopter being loaded into a cargo compartment using the control system of the present invention.

The helicopter is then positioned at the foot of the cargo compartment loading ramp, and the operator may use the control pendant (FIG. 5) to adjust the height of the landing gear shock struts so that the helicopter is in an initial loading position. The initial loading position will vary depending on the type of helicopter being loaded. The pendant is provided with a display 52 which provides a visual indication of the distance from each of the distance measuring sensors to the closest obstruction. Referring to FIGS. 5 and 6, the present embodiment is illustrated with distance sensors placed on the nose of the helicopter 54, the knee of the loading ramp 55, the top of the rotor 56 and the low point on the helicopter tail 57. Each of these distances is displayed on the pendant display 52.

The pendant is also provided with a manual control section to allow the operator to manually adjust the height of the helicopter. A selector switch 60 allows the operator to choose between the main landing gear and the tail landing gear, and a position control 62 is provided to raise or lower the selected landing gear. When the selector is placed in the raise position, the hydraulic pressure in the selected landing gear shock strut is increased, thereby increasing the extension of the shock strut and increasing the height of the helicopter. Similarly, when the switch is placed in the lower position, the pressure in the selected landing gear shock strut is decreased, thereby decreases the extension of the shock strut and decreases the height of the helicopter. The manual control section is also provided with a winch control switch 65 which allows the operator to override the winch control to pull the helicopter into or discharge the helicopter from the cargo compartment.

The bottom of the pendant comprises an automatic loading section having a selector switch 67 which allows the operator to choose between loading and discharge of the helicopter. The automatic control section also comprises a momentary switch 70 which is used for automatic loading and discharge of the helicopter. For automatic helicopter positioning, the operator must continuously activate the momentary switch to an 'automatic control' position. If the operator releases the switch 70, all movement of the helicopter is immediately stopped. An emergency stop switch 72 is provided on the control pendant to override all of the control functions including raising and lowering of the landing gear and the winch to stop all action in case imminent damage or injury is about to occur to the helicopter, cargo compartment or a member of the crew.

Figure 7:
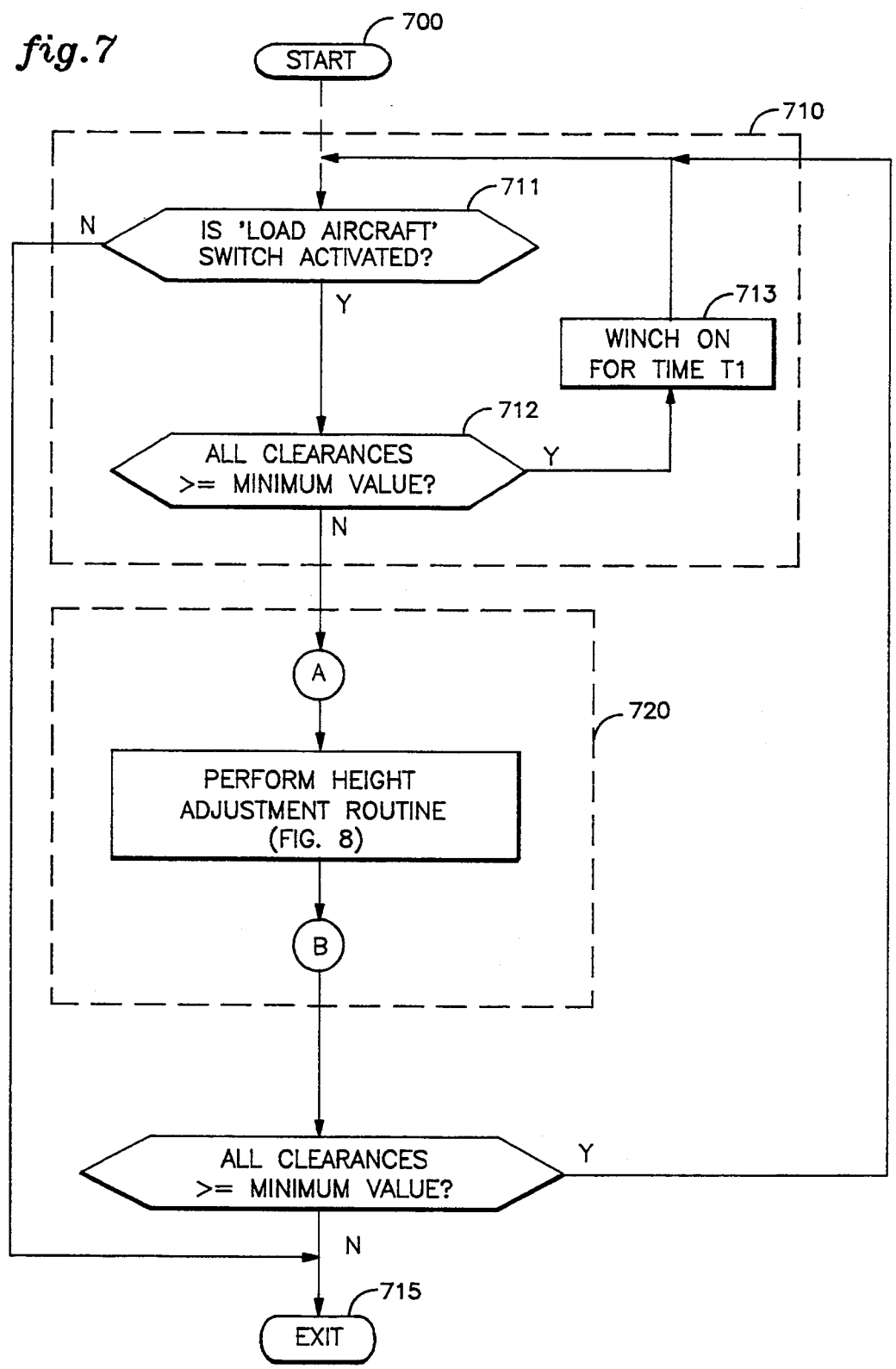
FIG. 7 is a flow diagram of a routine for controlling the loading and discharge of a helicopter from a transport cargo compartment.
Figure 8:
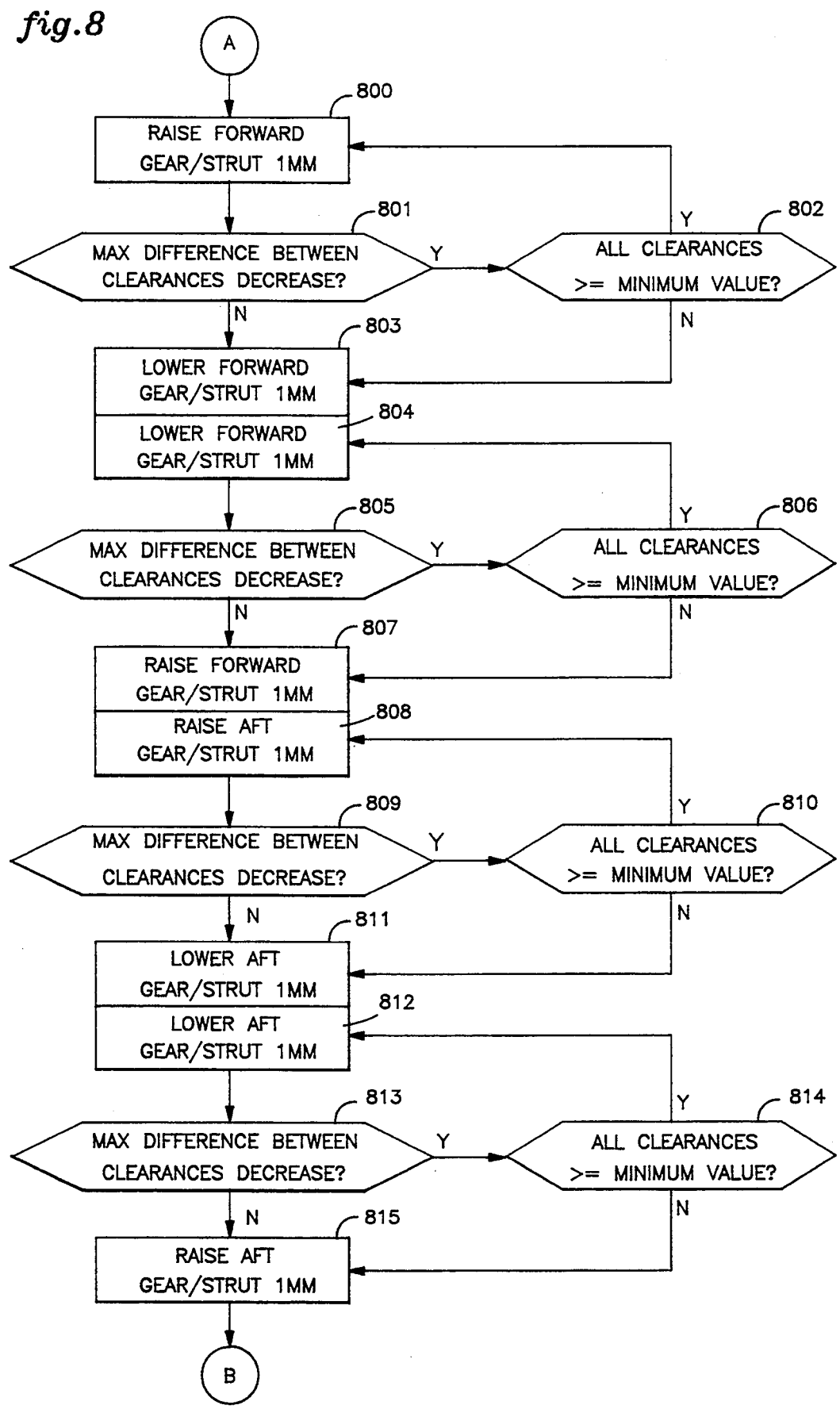
FIG. 8 is a flow diagram of a routine for adjusting the height of a helicopter during loading or discharge from a transport cargo compartment.

Once the helicopter is in position for loading, the operator places the selector switch 67 in the load position and holds the momentary switch 70 in the automatic load/unload position to automatically load the helicopter, and the UPROC performs the subroutines of FIGS. 7 and 8 to automatically load the helicopter into the cargo compartment. The subroutine of FIG. 7 controls the loading or discharge of the helicopter from the cargo compartment and the subroutine of FIG. 8 is used to adjust the height of the helicopter during loading if any of the measured distances is below the corresponding minimum allowable clearance.

The UPROC is provided with a look-up table which contains information relating to the minimum allowable clearance which may be encountered by any of the distance measuring sensors during loading. If any one of the distance measuring sensors measures a distance to an obstruction less than a corresponding minimum allowable clearance, automatic loading of the helicopter is immediately stopped and the height of the helicopter is adjusted in accordance with the subroutine of FIG. 8 prior to recommencing loading or discharge of the helicopter from the cargo compartment.

The automatic loading and discharge subroutine of FIG. 7 comprises a loading/discharge section 710, and a height adjustment section 720. When automatic loading of the helicopter is selected, the subroutine of FIG. 7 is entered in a step 700, and the UPROC checks if the control pendant momentary switch 70 is being activated by an operator to the automatic load/unload position in a test 711. If the results of the test 711 are negative, the subroutine exits in a step 715. If the results of the test 711 are positive, a test 712 is performed wherein all clearances are checked to make sure that they are above their minimum acceptable values. If all clearances are in the proper range, the result of the test 712 will be positive, and a step 713 is performed wherein the winch is activated for a period T1 to load the helicopter into the cargo compartment. The subroutine then returns to the tests 711 and 712. As long as the selector switch 70 remains activated, the tests and step 711 through 713 will continue to be performed until any one of the clearance's is less than the corresponding minimum allowable clearance.

If at any time a minimum allowable clearance is reached during loading of a helicopter, the results of the test 712 will be negative, and the subroutine of FIG. 8 is performed to adjust the helicopter's height. Referring to FIG. 8, the step 800 is first performed to raise the pressure in the forward landing gear shock struts to thereby increase the extension of the shock struts by approximately 1 millimeter. A test 801 is then performed to determined if the maximum difference between the various measured clearances has decreased. This test looks at the difference between the tightest measured clearance and the largest measured clearance to determine if this difference decreased due to the incremental change in shock strut extension resulting from step 800. The test 801 is performed to ensure that the attempted adjustment moves the helicopter towards the center of the clearance envelope during height adjustment, rather than simply adjusting the helicopter's height enough to increase all of the clearances above their corresponding minimum allowable values. If the results of the test 801 are positive the subroutine reaches a test 802 wherein the UPROC checks if all clearances are greater than or equal to there corresponding minimum allowable clearance. If the results of the test 802 are positive the subroutine returns to the step 800 wherein the hydraulic pressure to the forward landing gear shock struts is again increased to increase their extension by about 1 millimeter. The tests 801 and 802 are again performed.

If the results of either test 801 or 802 are negative, the subroutine reaches a step 803 wherein the pressure to the forward landing gear shock strut is decreased to lower the forward landing gear by the same amount that it was raised in the step 800. The subroutine then performs a step 804 to lower the hydraulic pressure to the forward landing gear shock struts to thereby decrease their extension by about 1 millimeter. Tests 805 and 806 are then performed to check if the maximum difference between the clearances has decreased and if all of the clearances are greater than or equal to their corresponding minimum allowable clearance. If the results of both the tests 805 and 806 are positive the step 804 is repeated. However, if the results of either of the tests 805 or 806 are negative, a step 807 is performed to increase the pressure to the forward landing gear shock struts to thereby raise the forward landing gear by the same amount that it was lowered in the step 804. This sequence is repeated for the aft landing gear in the steps and tests 808 through 815. The subroutine of FIG. 8 not only ensures that all the clearances are greater than or equal to there minimum allowable clearance values, but also maximizes the clearances prior to recommencing movement of the helicopter in the tests and step 711 through 713.

When step 815 is performed and the subroutine of FIG. 8 is exited, the subroutine of FIG. 7 reaches a test 720 wherein the UPROC checks if all the clearances are greater than or equal to their corresponding minimum allowable clearances. If the results of the test 720 are positive, the subroutine returns to the tests and step 711 through 713 to continue positioning of the helicopter. If the results of the test 720 are negative, the subroutine of FIG. 8 was unable to properly adjust the height of the helicopter so that all clearances are greater than their minimum values, and the subroutine exits in the step 715. In this situation, the operator is required to manually reposition the helicopter height.

The invention is described with respect to loading of a helicopter in a cargo compartment; however, the invention is equally applicable to the discharge of a helicopter from a cargo compartment. The only difference is that instead of pulling the helicopter into the cargo compartment, the helicopter is pulled out of the compartment. If any of the measured distances are less than a corresponding minimum allowable clearance while the helicopter is being discharged, movement of the helicopter is stopped until its height is adjusted with all of the clearances in the proper range.

The helicopter shock struts are described herein as being hydraulic, and the height of the helicopter is adjusted by varying the hydraulic pressure in the shock struts. However, the invention would work equally as well with a helicopter having pneumatic shock struts which are used to adjust helicopter height by varying the pneumatic pressure in the shock struts. Similarly, the height of a helicopter having mechanical shock struts, i.e., spring loaded, can be adjust using a mechanical or electro-mechanical device.

Although the invention is described with respect to the loading and discharge of helicopters, it is equally applicable to the loading and discharge of other types of vehicles. All that is required is capability to adjust the height of the vehicle. This may be accomplished as described herein by increasing and venting hydraulic pressure. Alternatively, pneumatic and electro-mechanical devices may be used for height adjustment.

Although the invention has been described and illustrated with respect to exemplary embodiments thereof, it should be understood by those skilled in the yard that the foregoing and various other changes, emissions and additions may be made therein and thereto without departing from the spirit and scope of the present invention.

We claim:

1. A system for automatic loading and unloading of a vehicle in a cargo compartment comprising:
   height adjustment means installed on said vehicle responsive to control signals for adjusting the height of said vehicle;
   at least one distance measuring sensor for providing distance signals indicative of the distance between the vehicle and the cargo compartment;
   positioning means for moving the vehicle into and out of the cargo compartment; and
   signal processing means responsive to said distance signals being greater than or equal to corresponding minimum allowable clearances for operating said positioning means to move the vehicle into or out of the cargo compartment, and responsive to said distance signals being less than said corresponding minimum allowable clearances for discontinuing operation of said positioning means, providing control signals to said height adjustment means to adjust the height of the vehicle until said distance signals are greater than or equal to said corresponding minimum allowable clearances, and thereafter recommencing operation of said positioning means.

2. The system according to claim 1 wherein said height adjustment means comprises:
   at least one shock strut assembly; and
   means for adjusting the extension of said shock strut assembly.

3. The system according to claim 2 wherein said shock strut assembly is a hydraulic shock strut and wherein said means for adjusting the extension of said shock strut is a hydraulic power plant connected to said shock strut for controlling the hydraulic pressure therein, thereby controlling the extension of said shock strut.

4. The system according to claim 1 wherein said positioning means is a winch.

5. The system according to claim 1 further comprising:
   automatic control means responsive to the activation thereof for providing an automatic control signal to said signal processing means; and
   said signal processing means being responsive to said distance signals only in response to the presence of said automatic control signal.

6. The system according to claim 1 wherein said signal processing means provides controls signals to said height adjustment means to adjust the height of said vehicle such that said distance signals are approximately equal.

7. A system for automatic loading and unloading of a helicopter in a cargo compartment, the helicopter having a plurality of landing gear assemblies, the system comprising:
   a shock strut associated with each of the landing gear assemblies;
   height adjustment means responsive to control signals for adjusting the extension of said shock struts, thereby adjusting the height of the helicopter;
   at least one distance measuring sensor for providing distance signals indicative of the distance between the helicopter air frame and the cargo compartment;
   positioning means for moving the helicopter into and out of the cargo compartment; and
   signal processing means responsive to said distance signals being greater than or equal to corresponding minimum allowable clearances for operating said positioning means to move the vehicle into or out of the cargo compartment, and responsive to said distance signals being less than said corresponding minimum allowable clearances for discontinuing operation of said positioning means, providing control signals to said height adjustment means to adjust the height of the helicopter until said distance signals are greater than or equal to said corresponding minimum allowable clearances, and thereafter recommencing operation of said positioning means.

8. The system according to claim 7 wherein said positioning means is a winch.

9. The system according to claim 7 further comprising:
   automatic control means responsive to the activation thereof for providing an automatic control signal to said signal processing means; and
   said signal processing means being responsive to said distance signals only in response to the presence of said automatic control signal.

10. The system according to claim 7 wherein said signal processing means provides controls signals to said height adjustment means to adjust the height of said helicopter such that said distance signals are approximately equal.

11. The system according to claim 7 wherein said shock struts are hydraulic shock struts, and wherein said height adjustment means is a hydraulic power plant for controlling connected to said shock struts for controlling the hydraulic pressure therein.

* * * * *